(12) United States Patent
Ben Levy et al.

(10) Patent No.: US 12,719,905 B1
(45) Date of Patent: Aug. 25, 2026

(54) APPLICATION PROGRAMMING INTERFACE MAP

(71) Applicant: Intuit Inc., Mountain View, CA (US)

(72) Inventors: Asaf Ben Levy, Sunnyvale, CA (US); Michael Kalika, Rishon Le-Tzion (IL); Chad Cloes, Escondido, CA (US); Francys Scott, San Diego, CA (US); Kyle Rose, Saint Johns, FL (US); Lorie Tatsugawa, San Francisco, CA (US); Itzik Vainsenker, Petah Tikva (IL); Gleb Keselman, Modiin (IL); Yaron Yehuda Karni, Tel Aviv (IL); Guy Belotzerkovsky, Hod Hasharon (IL); Zach Probst, Atlanta, GA (US); Marios Leventopoulos, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/345,812

(22) Filed: Sep. 30, 2025

(51) Int. Cl.
*H04L 9/40* (2022.01)
*G06F 9/54* (2006.01)

(52) U.S. Cl.
CPC .......... *H04L 63/1425* (2013.01); *G06F 9/547* (2013.01); *H04L 63/1441* (2013.01)

(58) Field of Classification Search
CPC .. H04L 63/1425; H04L 63/1441; G06F 9/547
See application file for complete search history.

(56) References Cited

U.S. PATENT DOCUMENTS 11,044,246 B1 * 6/2021 Freeling ................ H04L 9/3213
11,076,001 B1 * 7/2021 Mohamed ............ H04L 47/803
(Continued)

OTHER PUBLICATIONS

Rana et al., "Machine Learning Techniques Based Risk Detection in Digital Banking and Investment Channels," 2025 3rd International Conference on Cyber Resilience (ICCR) Year: 2025 | Conference Paper | Publisher: IEEE.*
(Continued)

*Primary Examiner* — Roderick Tolentino
(74) *Attorney, Agent, or Firm* — Dinsmore & Shohl LLP

(57) ABSTRACT

The present disclosure relates to systems and methods for application programming interface (API) mapping to address security and operational challenges in modern software ecosystems. The disclosed system introduces an API map that associates API calls with session identifiers, enabling the construction of detailed API transaction lineages and providing attribution to organizational teams, hardware infrastructure, and customer identities. Telemetry data from API gateways, service meshes, and event buses is captured to construct a central API inventory and identify business flows, such as "move money" or "file tax." The system facilitates anomaly detection, blast radius analysis, incident tracing, and fraud behavior investigation, while reducing mean time to detect (MTTD) and mean time to remediate (MTTR). The non-intrusive design integrates session IDs into HTTP headers, ensuring seamless compatibility with existing systems. By leveraging real-time visibility and advanced detection capabilities, the disclosed framework enhances security and operational efficiency in API ecosystems.

20 Claims, 8 Drawing Sheets

(56) References Cited

U.S. PATENT DOCUMENTS

| | | | | |
|---|---|---|---|---|
| 11,755,536 | B1 * | 9/2023 | Pushkin | G06F 11/3495 707/803 |
| 11,991,299 | B1 * | 5/2024 | Rosenoer | H04L 9/50 |
| 2019/0312860 | A1 * | 10/2019 | Dykes | H04L 63/10 |
| 2020/0028863 | A1 * | 1/2020 | Wolfson | H04L 63/145 |
| 2021/0103483 | A1 * | 4/2021 | Devine | G06F 9/541 |
| 2023/0336564 | A1 * | 10/2023 | Danielpour | G06N 20/00 |
| 2025/0217205 | A1 * | 7/2025 | Foster | G06F 21/56 |
| 2025/0293884 | A1 * | 9/2025 | Gilchrist | H04L 9/3213 |

OTHER PUBLICATIONS

Rajender et al., "Anomaly Detection in Financial Transactions Using Graph Mining," 2025 IEEE International Conference on Advanced Computing Technologies (ICACT) Year: 2025 | Conference Paper | Publisher: IEEE.*

* cited by examiner

APPLICATION PROGRAMMING INTERFACE MAP

BACKGROUND

Field

Aspects of the present disclosure relate to an application programming interface map.

Description of Related Art

An application programming interface (API) is a set of protocols, tools, and definitions that enable communication and data exchange between software applications, systems, or services. APIs serve as intermediaries, allowing different software components to interact seamlessly, regardless of their underlying architecture or programming language. By exposing specific functionalities or data endpoints, APIs enable developers to integrate and extend the capabilities of applications without requiring direct access to the underlying codebase. APIs are widely used in modern software ecosystems to facilitate interoperability, automate workflows, and enable scalable, modular system designs. They enable microservices architectures, cloud computing, and third-party integrations.

SUMMARY

Certain aspects provide a method for application programming interface (API) mapping. The method includes obtaining, in association with a first API entity, a session identifier associated with a first API call; obtaining, in association with a second API entity, the session identifier associated with a second API call; identifying an API transaction lineage including the first API call and the second API call based on the session identifier; detecting an anomaly associated with the second API call; identifying a session associated with the anomaly based on the session identifier; and triggering a mitigating action based on the session or the anomaly.

Certain aspects provide a method of API mapping. The method includes receiving, at a traffic monitoring system and from a plurality of sources, a plurality of session identifiers associated with a plurality of API calls, wherein the plurality of session identifiers are from a plurality of sources; constructing, based on metadata associated with the plurality of API calls, an API inventory that includes information regarding the plurality of API calls and the plurality of session identifiers; identifying, based on the API inventory, a plurality of API transaction lineages, wherein each API transaction lineage represents a sequence of API calls, of the plurality of API calls, associated with a session identifier of the plurality of session identifiers; identifying, based on the plurality of API transaction lineages, one or more business flows, wherein each business flow corresponds to a logical grouping of API transaction lineages associated with a specific business operation; detecting, using an anomaly detection system, an anomaly associated with at least one of the plurality of API calls; and triggering, based on the anomaly, a mitigating action to address the anomaly.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
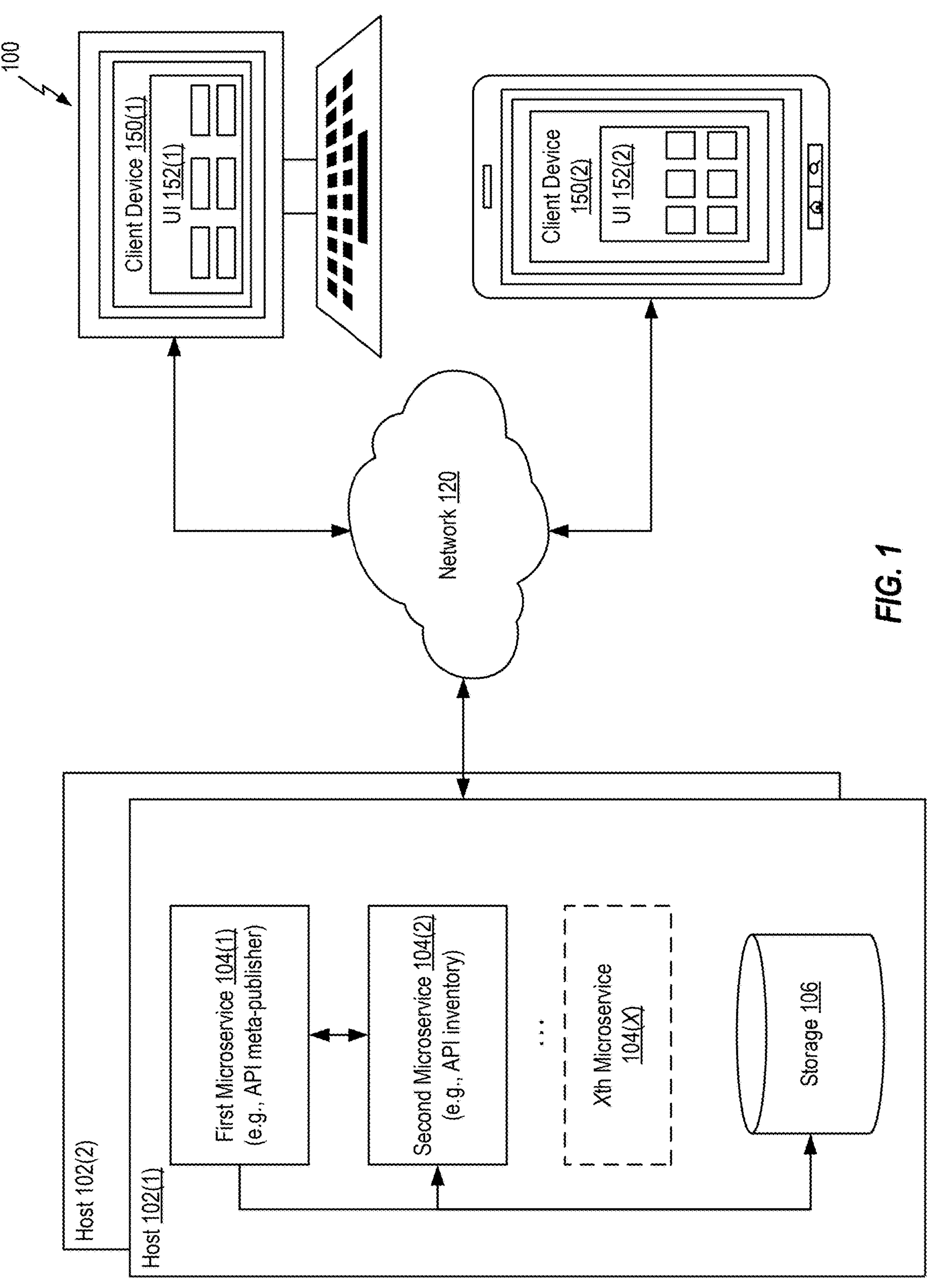
FIG. 1 is a schematic system diagram illustrating the interaction between application programming interface (API) entities, a network, and connected devices within the API mapping framework.

Aspects of the present disclosure provide apparatuses, methods, processing systems, and computer-readable mediums for application programming interface (API) mapping.

APIs facilitate communication between services, applications, and systems. Some entities may implement complex systems involving a number of APIs, API entities, and interactions. Such API entities may include API gateways, service meshes, event buses, cloud-based gateways, or the like. API gateways may handle API requests, responses, and routing. Service meshes may handle service-to-service communication within microservices architectures. Event buses may be used in event-driven architectures for asynchronous communication, and may be referred to as asynchronous entities. Cloud-based gateways, such as a web services API gateway, may enable access to hybrid and cloud-native environments.

However, the increasing complexity and scale of API traffic have introduced vulnerabilities, including prolonged dwell times for bad actors, difficulty in tracing attacks across services, and challenges in assessing the impact of security incidents. The increasing complexity and scale of API traffic have created significant challenges for maintaining security and operational visibility within modern software ecosystems. As APIs facilitate communication between numerous services, applications, and systems, the volume and diversity of API interactions make it difficult to monitor and analyze traffic effectively. This complexity provides opportunities for malicious actors to exploit vulnerabilities, leading to prolonged dwell times where attackers remain undetected within the system. Additionally, the distributed nature of API architectures, often spanning multiple services and microservices, complicates the process of tracing attacks across interconnected components. Security teams face difficulties in identifying the origin of an attack, understanding its propagation path, and determining the affected services and data. Furthermore, the lack of comprehensive visibility into API transactions hinders the ability to assess the upstream and downstream impact of security incidents, making it challenging to quantify the scope of damage and implement effective mitigation strategies. These vulnerabilities underscore the need for robust systems that provide real-time visibility, attribution, and advanced detection capabilities to address the evolving threats in API ecosystems.

One technical problem associated with API usage is the lack of reliable, real-time visibility into API traffic and its associated metadata. Traditional approaches often rely on partial telemetry data or intrusive monitoring techniques, which fail to provide complete coverage and impose implementation burdens on individual services. This opacity in API transactions hampers the ability to detect anomalies, trace incidents, and assess the upstream and downstream impact of attacks. Additionally, existing systems struggle to attribute API calls to their organizational, hardware, and user contexts, further complicating security investigations and operational triage.

The disclosed system addresses these technical problems by introducing an API map. The API map is based on associating API calls with a session identifier (ID), enabling the construction of detailed API transaction lineages and providing attribution to internal organizational teams, hardware infrastructure, and customer identities. The session ID serves as a unique identifier that connects API calls to a specific session and thus to various identifiers, enabling association of the API calls with attributes such as device fingerprint, network geolocation, or other contextual metadata. This approach allows for comprehensive visibility into API traffic, enabling advanced decisions in API detection and response while eliminating or reducing reliance on intrusive technologies like OpenTelemetry.

The API map captures telemetry data for any API traffic that includes a session identifier. The telemetry data may include metadata from API entities. This data is used to construct an API inventory and API transaction lineage in real-time, providing full clarity into the upstream and downstream impact of API calls. The disclosed system further enables the clustering of transaction lineages into business flows, such as "move money," "file tax," or "open an account," facilitating the identification of common patterns and anomalies. Thus, for example, an anomaly can be detected when a user's API interactions, as part of a session that was established to address a particular business flow, deviate from an API transaction lineage that corresponds to the particular business flow. By leveraging this detailed visibility, the disclosed system enhances security capabilities, including blast radius analysis, faster incident tracing, root cause analysis (RCA) diagram creation, and fraud behavior investigation.

Another technical benefit provided by the disclosed system is its non-intrusive approach to traffic interception. The framework captures telemetry data at the gateway level and adds session IDs to all hypertext transfer protocol (HTTP) calls as headers, allowing downstream services to receive the session ID without requiring any changes to their implementation. This design may provide seamless integration with existing systems while maintaining comprehensive monitoring and security coverage. The disclosed system also integrates with a graph database to provide attribution to internal teams and hardware, enabling efficient triage and mitigation of attacks. It should be noted that, while aspects described herein are described with regard to the addition of session IDs to HTTP calls, aspects described herein can be used to add the session IDs to any form of API call.

A detection system incorporated in the disclosed framework employs business logic anomaly detection to identify anomalies in API usage. By observing a portion of API traffic payloads in near real-time and complementing this with metadata from the API map, the system detects anomalies and provides actionable insights for alerting and mitigation. This combination of real-time telemetry data and anomaly detection significantly reduces the mean time to detect (MTTD) and mean time to remediate (MTTR), reducing the dwell time of bad actors in the system.

The disclosed system provides several use cases that demonstrate its technical advantages. For example, blast radius analysis enables security investigators to assess the impact of an attack by identifying the upstream and downstream APIs involved, as well as other transactions made by the same session. Faster incident tracing allows teams to initiate war rooms immediately based on transaction IDs and visualize the relevant APIs and services involved. Fraud behavior investigation leverages session transaction clustering to detect fraudulent patterns and develop new policies. Additionally, the disclosed system facilitates network and API performance triage by providing visibility into timestamps and lag across services.

In summary, the disclosed framework addresses gaps in API security and visibility by providing a robust system for real-time telemetry data capture, API mapping, and anomaly detection. Its non-intrusive design, comprehensive coverage, and advanced attribution capabilities enable efficient detection, mitigation, and response to security incidents, delivering significant technical benefits to API ecosystems. By reducing dwell time, enhancing operational efficiency, and improving security posture, the disclosed system represents a transformative solution for modern API architectures.

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements an API meta-publisher, which is a network 120 accessible service described in more detail elsewhere herein. In certain aspects, the API meta-publisher stores its data in storage 106. In certain aspects, the second microservice 104(2) implements an API inventory. The API inventory may be a service that stores information regarding API calls, API transaction lineages, or the like, as described with respect to FIGS. 2-7. A microservice 104, or a host 102 that implements a microservice 104, may be referred to as an apparatus.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Figure 2:
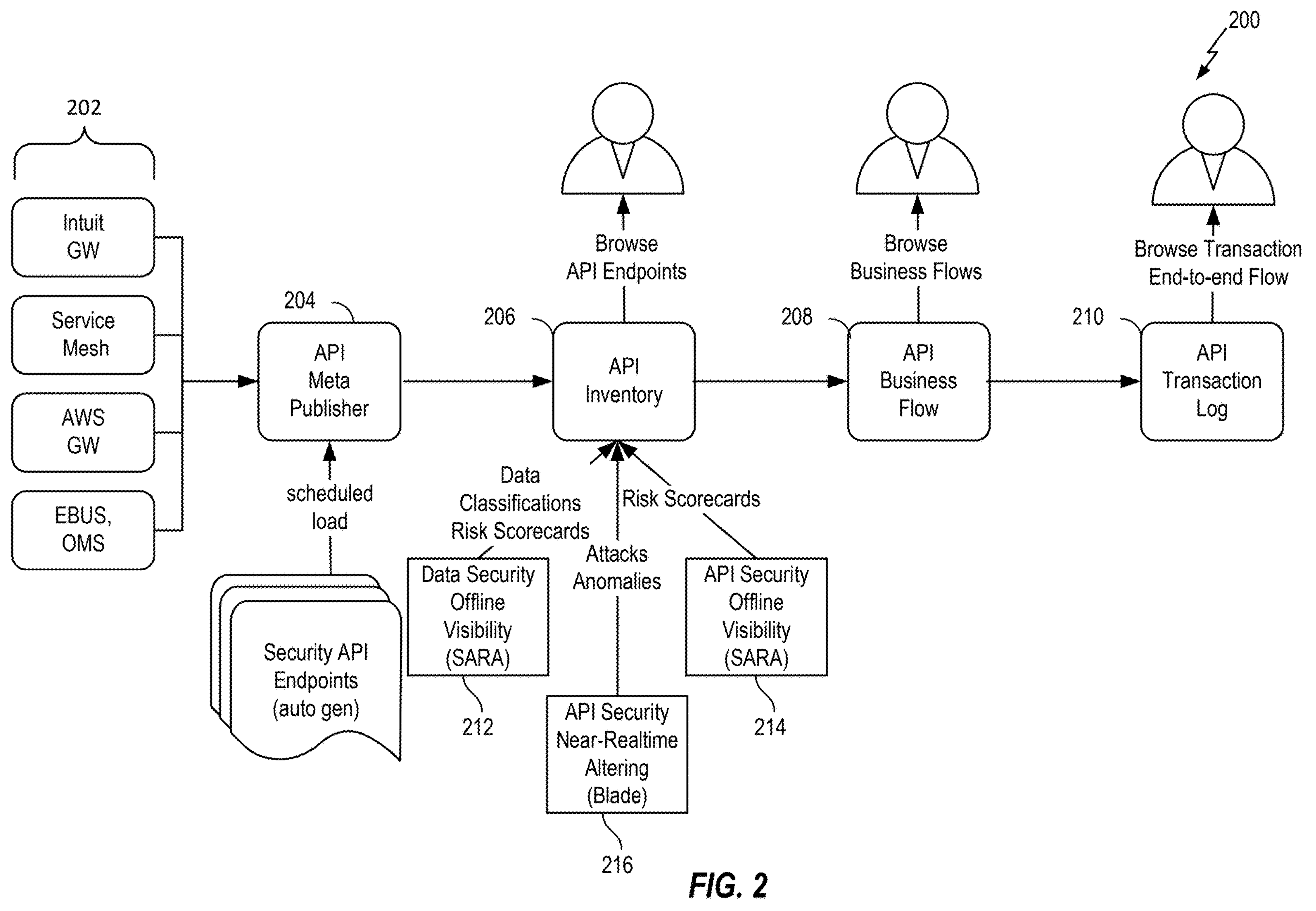
FIG. 2 is a schematic block diagram illustrating an API mapping system for visualizing endpoints, business flows, transaction flows, and associated risk metrics.

FIG. 2 is a diagram illustrating an example 200 of populating an API inventory, identifying business flows, and identifying an anomaly based on session identifiers. Example 200 includes a plurality of API entities 202, an API meta-publisher 204, an API inventory 206, an API business flow module 208, and an API transaction log 210.

An API entity 202 may add session IDs to API calls. For example, an API entity 202 may intercept HTTP traffic comprising an API call and embedding the session identifier into the header of each API call. When a user session is established, a token associated with the user session is cached, and the session ID is derived from this token. As API calls pass through the API entities 202, the API entities 202 (e.g., non-intrusively) modify or append each API call with the session ID corresponding to the token, ensuring that downstream services receive the session identifier without requiring any modifications to their implementation. This approach allows the session ID to propagate seamlessly across interconnected services, enabling the construction of API transaction lineages and providing contextual visibility into API interactions. By embedding session IDs at the API entity 202 level, aspects described herein provide comprehensive coverage of API traffic while maintaining compatibility with existing architectures and minimizing implementation overhead for service owners.

An API call is a request made by one software component to another, typically through a defined API, to access specific functionality or data. An API endpoint is the specific access point or uniform resource locator (URL) exposed by a service where API calls are directed, representing a particular resource or operation within the service. The API entity 202 acts as an intermediary that manages and routes API calls between services, ensuring secure and efficient communication. The API entity 202 may also perform additional functions such as traffic monitoring, load balancing, and embedding metadata, such as session identifiers, into API calls. In some aspects, an API entity 202 may be a service. Additionally, or alternatively, a service may be associated with an API entity 202 which may receive or transmit API traffic associated with the service. A session identifier is an identifier associated with a user session. The session identifier links API calls to a specific session and the session's contextual attributes, such as identity information (e.g., user identity, device fingerprint, network information, geolocation, etc.). Together, these elements enable seamless interaction between services, while providing metadata for tracking, security, and operational analysis.

The API meta-publisher 204 is a system component that intercepts and collects telemetry data from API traffic across various infrastructure layers, such as API gateways, service meshes, and event buses. This telemetry data includes metadata such as session identifiers, transaction identifiers, timestamps, and contextual attributes, which can be used to construct the API inventory 206 and API transaction lineages. The API meta-publisher 204 also interacts with security API endpoints to enhance security monitoring and attribution capabilities. These security API endpoints provide access to data, such as anomaly detection results, API security scorecards, and data security assessments, enabling the API meta-publisher 204 to enrich the API inventory 206 with actionable insights. By aggregating and publishing this metadata in real time, the API meta-publisher 204 facilitates comprehensive visibility into API interactions, supports anomaly detection, and enables efficient triage and mitigation of security incidents.

The API meta-publisher 204 collects API calls and session IDs by intercepting telemetry data from API entities 202 (such as API gateways, service meshes, or event buses) as API traffic flows through the API entities 202. This telemetry data includes metadata such as session identifiers, transaction identifiers, timestamps, or contextual attributes, which are captured non-intrusively at the gateway level. Once collected, the API meta-publisher 204 may process this telemetry data, such as to create a dataset for addition to an API inventory 206. The API meta-publisher 204 may provide the processed data (e.g., in real time) to the API inventory 206.

The API inventory 206 uses this data to populate and maintain a comprehensive record of API endpoints, API transaction lineages, and session-level interactions. API transaction lineages are described in more detail in connection with FIG. 3. By continuously updating the API inventory 206 with records of new API calls and session IDs, the API meta-publisher 204 ensures that the API inventory 206 reflects a current state of the API ecosystem, enabling real-time visibility, anomaly detection, and operational analysis. This integration allows organizations or threat detection entities to monitor API traffic effectively without modifications to existing services or infrastructure.

The API business flow module 208 defines and catalogs business flows by analyzing API transaction lineages. For example, the API business flow module 208 may cluster API transaction lineages into logical groupings that represent specific business operations. The API business flow module 208 may identify business flows based on patterns in metadata associated with API calls (such as session identifiers, transaction identifiers, timestamps, and contextual attributes) like user actions and service dependencies. For example, the API business flow module 208 analyzes the metadata associated with API calls to uncover recurring patterns that indicate specific business operations. By leveraging clustering algorithms and machine learning techniques, the module identifies relationships between API transaction lineages, grouping sets of API transaction lineages (or sets of individual API calls) into logical clusters that represent distinct business flows. These clusters are defined based on shared attributes, such as session identifiers, transaction identifiers, timestamps, or contextual data (such as user actions, device fingerprints, and service dependencies). For example, a business flow such as "move money" may include a sequence of API calls related to account verification, fund transfer initiation, and transaction confirmation. Once identified, these business flows are cataloged and labeled, enabling organizations to gain structured insights into their operational processes, detect anomalies within specific flows, and optimize workflows for improved efficiency and security. By providing a structured representation of business flows, the API business flow module 208 enhances visibility into the API ecosystem and supports efficient security monitoring, fraud detection, and operational triage.

A business flow is a logical sequence of operations or interactions within a system that collectively represent a specific business activity or process. A business flow is composed of API calls and/or API transaction lineages that are triggered by user actions or system events, such as "move money," "file tax," or "open an account." Business flows provide a high-level view of how technical systems support business objectives, enabling optimization, security monitoring, and fraud detection across the API ecosystem.

An API transaction log 210 is a record, data structure, or the like. The API transaction log 210 may capture API calls associated with a specific transaction, including metadata such as session identifiers, transaction identifiers, timestamps, and contextual attributes like user identity, device information, and network geolocation. The API transaction log 210 provides a chronological view of a given transaction's journey across interconnected services and API endpoints based on API calls associated with the given transaction, enabling tracing of the transaction's end-to-end flow. By leveraging the API transaction log 210, entities can browse or extract information from a sequence of API calls within a transaction to understand upstream and downstream dependencies, identify anomalies, and/or assess the impact of security incidents or operational issues. This structured visibility into the transaction's flow supports efficient troubleshooting, root cause analysis, and optimization of workflows, while also enhancing security monitoring and fraud detection capabilities.

The API inventory 206 provides offline visibility into data security at 212 and API security at 214 by maintaining a comprehensive record of API endpoints, transaction lineages, and associated metadata. This offline capability enables entities to analyze sensitive data flows and assess potential vulnerabilities without relying on real-time monitoring. For data security at 212, the API inventory can identify endpoints that handle sensitive information, evaluate encryption practices, or detect potential data leakage risks. For API security at 214, the inventory can surface security scorecards, highlight endpoints with weak authentication mechanisms, or flag APIs that may be susceptible to attacks. By leveraging this offline visibility, organizations can proactively address security gaps, implement best practices, and ensure compliance with data protection standards, thereby strengthening the overall security posture of their API ecosystem. Furthermore, as described above, the API inventory 206 enables near-real-time API security monitoring at 216 by continuously aggregating and updating telemetry data from API calls, including session identifiers, transaction identifiers, timestamps, and contextual attributes. When an anomaly is detected, the API inventory 206 facilitates the triggering of mitigating actions by providing insights into the affected API endpoints, transaction lineages, and associated metadata. These mitigating actions may include blocking malicious API calls, isolating compromised services, or alerting relevant parties for immediate intervention. By leveraging the API inventory's real-time capabilities, organizations can reduce the MTTD and MTTR, ensuring a swift and effective response to security incidents while maintaining the integrity of their API ecosystem.

Figure 3:
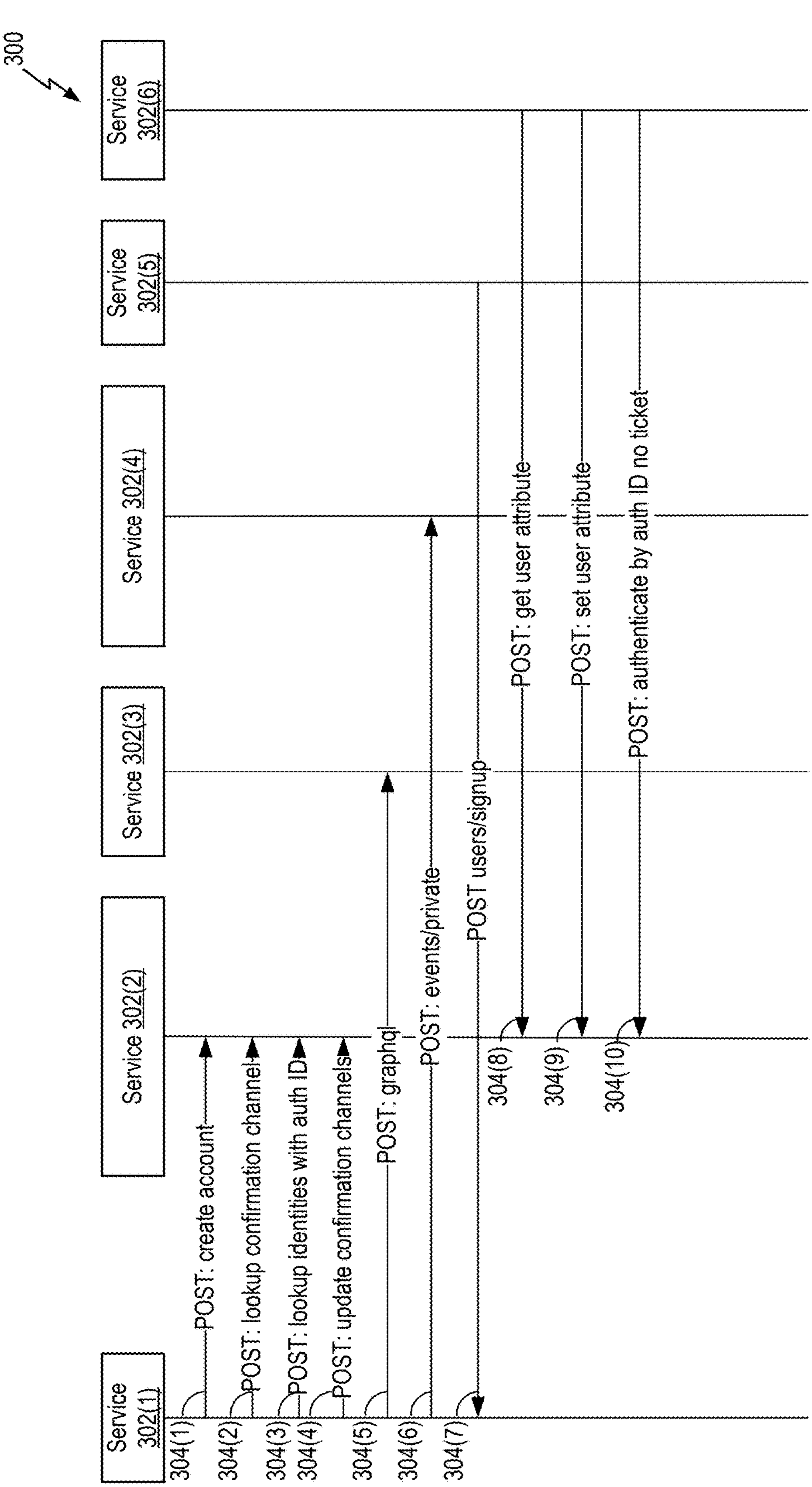
FIG. 3 is a schematic diagram illustrating an example of API transaction lineages.

FIG. 3 is a diagram illustrating an example 300 of an API transaction lineage. Example 300 includes a set of services 302. API endpoints 304 are illustrated between the set of services 302.

Services 302 represent discrete software components or microservices (e.g., microservice 104) within a distributed system architecture. A service 302 may be designed to perform a specific function, such as processing data, executing business logic, or interacting with external systems. In some software ecosystems, services 302 are modular and independently deployable, enabling scalability, fault isolation, and ease of maintenance. APIs serve as the communication interface between services 302, allowing services 302 to exchange data and coordinate operations seamlessly. By using APIs, services 302 can interact with one another regardless of differences in programming languages, platforms, or underlying architectures, fostering interoperability and enabling the creation of complex, interconnected systems. API endpoints 304 are specific access points exposed by services 302 to facilitate communication and data exchange. Each API endpoint 304 corresponds to a defined functionality or resource within a service, such as retrieving data, submitting a request, or executing a particular operation. API calls are directed to these endpoints, enabling external systems or other services to invoke the desired functionality.

In some aspects, an apparatus may identify an API transaction lineage based on an API inventory 206. For example, the API inventory 206 may aggregate and organize telemetry data associated with API calls. By maintaining a comprehensive record of API interactions, the API inventory 206 enables the construction of detailed transaction lineages that trace the flow of API calls across interconnected services. An API transaction lineage indicates the specific API calls within a series of API calls. For example, the API transaction lineage may capture a sequence and contextual relationships of the API calls to form a cohesive representation of a transaction. The API transaction lineage is constructed by evaluating a series of API calls for similarity to transaction lineages, which may involve evaluating data of the API inventory 206, such as session identifiers, transaction identifiers, timestamps, and contextual attributes like device fingerprints, network geolocation, and service dependencies. For example, clustering algorithms or embedding techniques can be used to analyze the metadata and identify patterns that match existing transaction lineages. By assessing the similarity of API calls to known API transaction lineages, the system can determine whether the series of API calls conforms to a specific transaction lineage. This process enables the apparatus to trace the flow of API calls across services 302, providing visibility into the upstream and downstream dependencies of a transaction. The detailed lineage, enriched with time and identity information, supports anomaly detection, operational triage, and attribution, allowing for precise identification of security incidents or performance bottlenecks.

Figure 4:
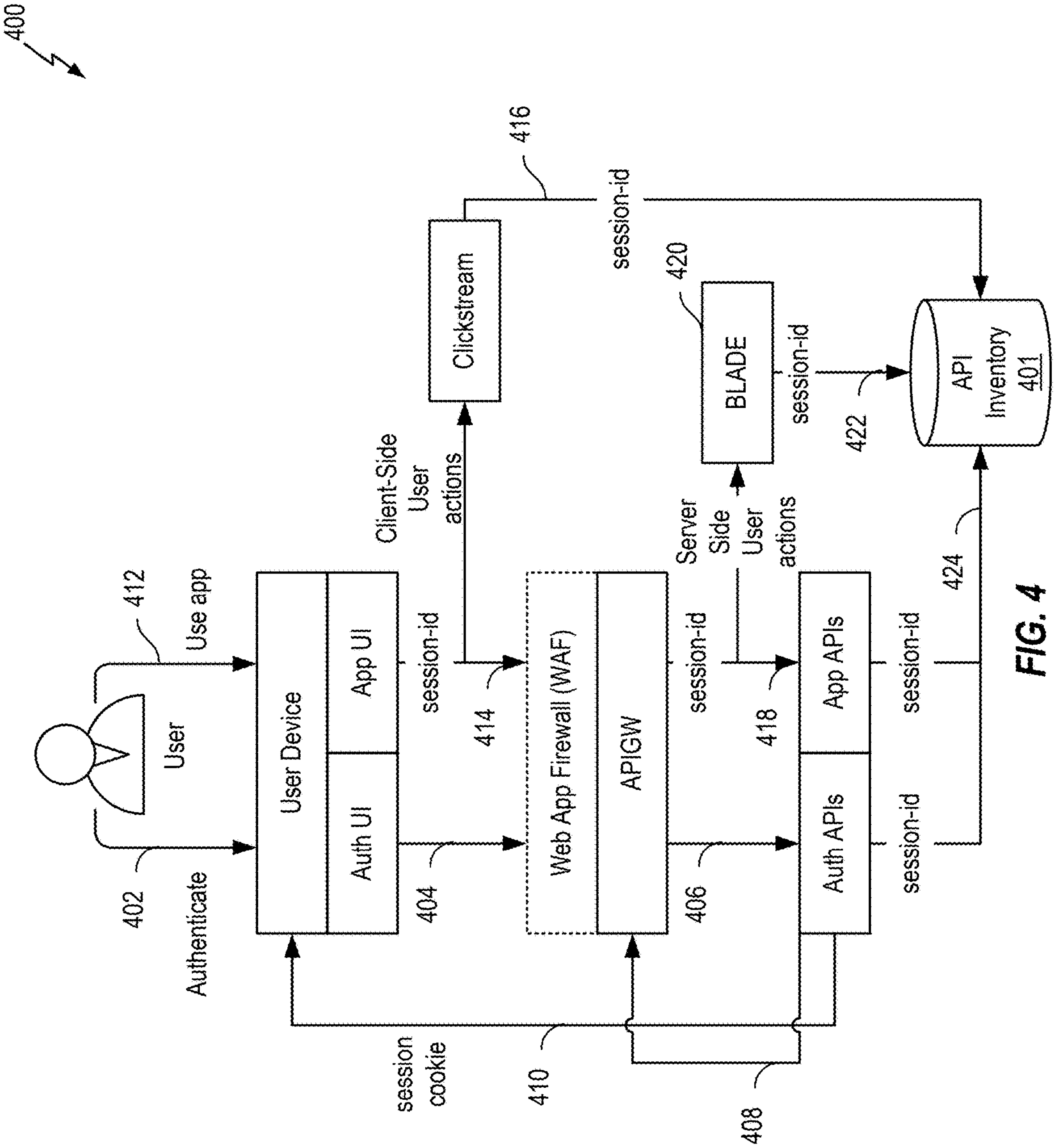
FIG. 4 is a schematic flow chart diagram illustrating a process of session ID propagation and API interaction monitoring.

FIG. 4 is a diagram illustrating an example 400 of adding session identifiers to API calls and monitoring the API calls based on the session identifiers.

FIG. 4 illustrates interaction between a user, a user device, and various system components, including an API transaction log 401 (e.g., API inventory 206, storage 106). At step 402, the user authenticates the user device using an authentication user interface (UI), such as to establish a session. As part of this authentication process, the authentication UI at 404 interacts with a web application firewall (WAF) and an API gateway, which is an example of an API entity as described in connection with FIG. 2. At step 406, the API gateway communicates with an authentication API, which at step 408 provides a session cookie, such as a token, to the user device. This session cookie enables the derivation or identification of a session identifier, associating the user device with a session, and the subsequent inclusion in or attachment to API calls of the session identifier.

A session is associated with a token that is generated and cached during the authentication process. This token serves as the basis for deriving a session identifier, which is then attached to API calls as they pass through API entities. By including the session identifier into (or appending the session identifier to) headers of each API call, the system ensures seamless propagation of session context across interconnected services, enabling detailed tracking and analysis of API interactions.

Once authenticated, the user begins interacting with the authenticated application at step 412. The application UI generates an API call or performs another form of interaction at step 414, which is routed through or triggers an API call to be provided via the WAF and API gateway. This API call includes the session identifier, which is also captured (e.g., as part of clickstream data) at step 416 and provided to the API transaction log 401. For example, the session identifier may be added by the API gateway. The API transaction log 401 stores the session identifier along with other metadata from client-side user interactions, enabling the construction of detailed transaction lineages and business flows, as described elsewhere herein. At step 418, the API gateway forwards (or generates) an API call to an application API associated with the authenticated application. This API call also includes the session identifier, which may be added by the API gateway non-intrusively based on a token associated with the session, as detailed in the description of API entities in FIG. 2.

Server-side user interactions are monitored at step 420 by an API publisher, which may observe API traffic and detect anomalies. The API logging component collects session identifiers from API traffic and provides them to the API transaction log 401 at step 422. Additionally, both the authentication API and the application API contribute session identifiers to the API transaction log 401 at 424 (for example, upon authentication or establishment of the session by the authentication API at 402-406, or upon user interaction with the application at 412). This integration of session identifiers into the API transaction log 401 enables real-time visibility, anomaly detection, and efficient response to security incidents, as further discussed in connection with FIG. 5.

Figure 5:
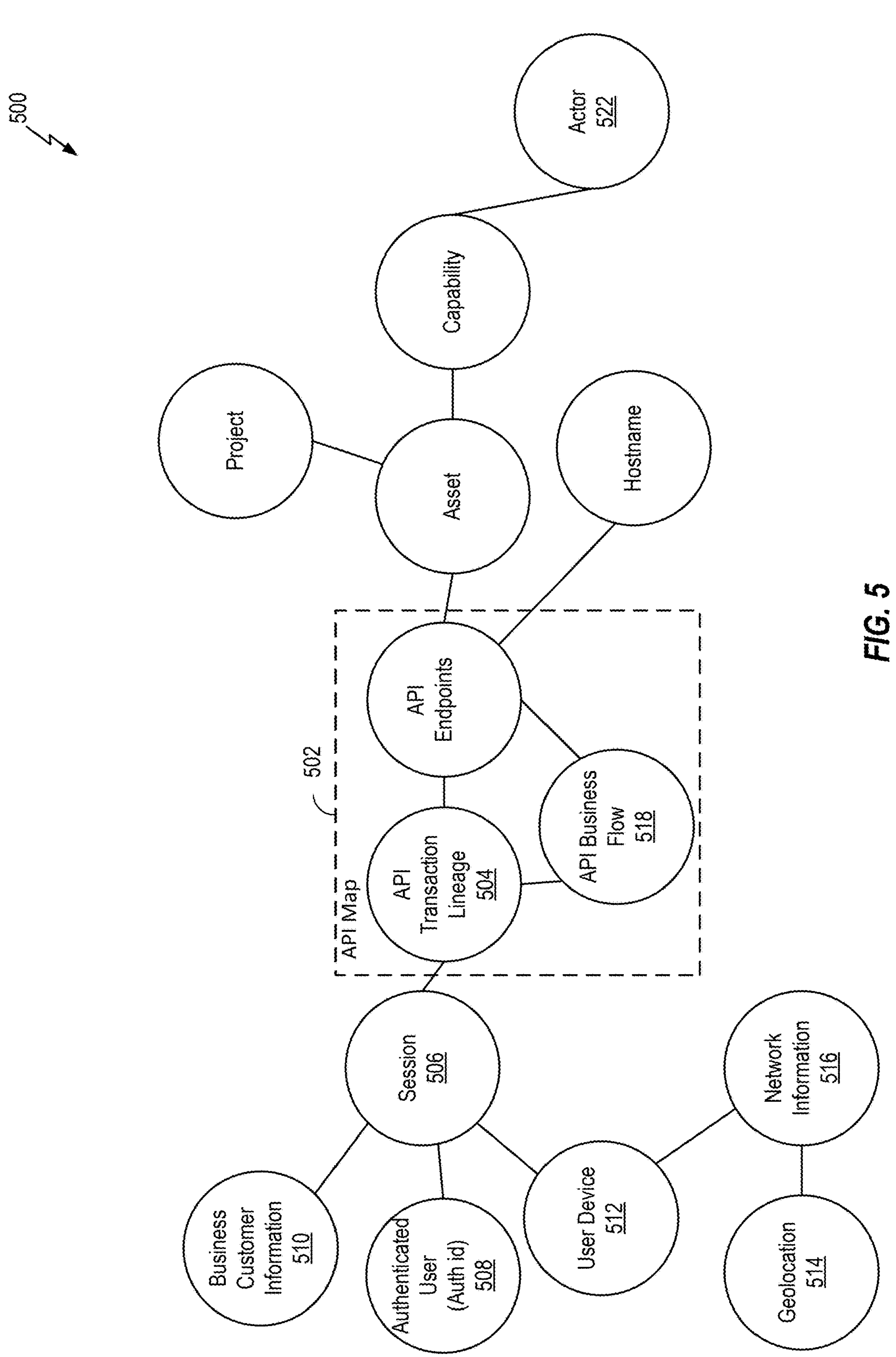
FIG. 5 is a schematic diagram illustrating an API map's integration of transaction lineage, endpoints, and associated contextual metadata.

FIG. 5 is a diagram illustrating an example 500 of identity information associated with an API transaction lineage.

An API map 502 is shown. The API map 502 includes an API transaction 504, which represents an API call associated with a specific transaction. In some aspects, the API map 502 may include an API lineage, which represents a sequence of API calls associated with a specific transaction. The API transaction 504 is linked to various identity information, including session information 506, authenticated user information 508 (referred to as an "Auth ID"), business customer information 510, user device information 512, geolocation data 514, and/or network information 516. The API map 502 also includes business flows 518, which cluster API transaction lineages into logical groupings representing specific business operations, and API endpoints 520, which serve as access points for services involved in the transaction. Additionally, the API map 502 (e.g., the API endpoints) is connected to organizational attributes such as services, applications, projects, and capabilities, as well as hostnames, which provide attribution to internal teams and infrastructure. Finally, the API map 502 identifies or is associated with responsible parties 522 (sometimes referred to herein as actors), who can be associated with (e.g., triggered to perform) mitigating actions based on the transaction lineage and contextual metadata. A responsible party 522 may include a service, an administrator, a technician, a ticket system, a security system, or the like. This comprehensive mapping facilitates real-time visibility, anomaly detection, and efficient response to security incidents. In some aspects, the API transaction 504 is stored (e.g., with other API transactions or API transaction lineages) by an API transaction storage module, such that the API transaction can be obtained for later identification of malicious attacks.

The API map 502 is associated with an API transaction 504, which can be linked to identity information to provide detailed attribution and context for API interactions. Session information 506 includes information regarding a user session, such as a start time of the session, an end time of the session, a business flow associated with the session, or the like. Authenticated user information 508 identifies an authenticated user associated with the session. Business customer information 510 links the transaction to a specific business entity or customer account, facilitating organizational attribution. User device information 512 captures details about the device used during the session, such as a device type, a fingerprint, a device identifier, or the like, aiding in fraud detection and security analysis. Geolocation data 514 provides a physical location of the device or user, offering context for anomaly detection and risk assessment. Network information 516 includes details about the network used for API calls, such as IP addresses or subnet data, enabling further investigation into connectivity and security issues.

The API endpoints 520 are linked to information that can be used to identify a responsible party 522 responsible for executing a mitigating action in response to an anomaly or security incident. This information includes metadata such as session identifiers, transaction identifiers, service ownership details, and organizational attributes like assets, projects, and capabilities. By associating API endpoints with these attributes, the system can determine the relevant teams, individuals, or automated systems responsible for addressing the issue. The responsible party 522 may represent a security investigator, a development team, or an automated response system tasked with implementing mitigating actions, such as blocking malicious API calls, isolating compromised services, or initiating incident response workflows. This linkage ensures that the appropriate resources are engaged to resolve the issue efficiently and effectively, minimizing the impact on the API ecosystem.

As described above, the techniques disclosed herein can be used to trigger a responsible party 522 to perform a mitigating action based on a detected anomaly. As a first example, the anomaly may include a malicious attack targeting an API endpoint through repeated unauthorized access attempts. In this example, the mitigating action may include blocking the offending IP address at the web application firewall (WAF) level and isolating the compromised API endpoint.

In this example, the responsible party 522 may include a security investigator or automated response system tasked with implementing the block and initiating further investigation.

As another example, an anomaly may include fraudulent behavior detected in a user session, such as unusual transaction patterns or device changes inconsistent with the user's profile. In this example, the mitigating action may include flagging the session as suspicious, revoking a session token, and temporarily suspending the user account for review. In this example, the responsible party 522 may include a fraud detection team or customer trust and safety team responsible for reviewing the flagged session and taking appropriate action.

As another example, an anomaly may include a data leakage incident where sensitive information is exposed through an API endpoint with weak encryption practices. In this example, a mitigating action may include disabling the vulnerable API endpoint, notifying the development team to implement stronger encryption, and issuing alerts to affected stakeholders. In this example, the responsible party 522 may include a development team or data security team tasked with remediating the vulnerability and ensuring compliance with data protection standards.

As another example, an anomaly may include performance bottleneck caused by excessive API call latency across interconnected services. In this example, the mitigating action may include identifying the affected services, optimizing the API call routing, and scaling infrastructure resources to handle the increased load. In this example, the responsible party 522 may include an operations team or system architect responsible for addressing the performance issue and ensuring system stability.

In some aspects, the system identifies an anomaly based on an embedding of an API transaction lineage. Identifying an anomaly based on an embedding of an API transaction lineage involves creating a mathematical representation of the transaction lineage that captures its attributes and relationships. This embedding is generated by analyzing metadata associated with the API calls, such as session identifiers, transaction identifiers, timestamps, device fingerprints, network geolocation, and service dependencies. Using machine learning techniques, the system compares the embedding of the current API transaction lineage to embeddings of known transaction lineages or business flows. If the current embedding deviates significantly (e.g., by more than a threshold, when measured according to a similarity score such as a cosine similarity) from expected patterns or exhibits similarities to embeddings associated with anomalous or fraudulent behaviors, the system flags the transaction lineage as anomalous. This approach enables precise detection of irregularities in API interactions, leveraging the structured representation of transaction lineages to identify anomalies that may indicate security threats, operational issues, or fraud.

Figure 6:
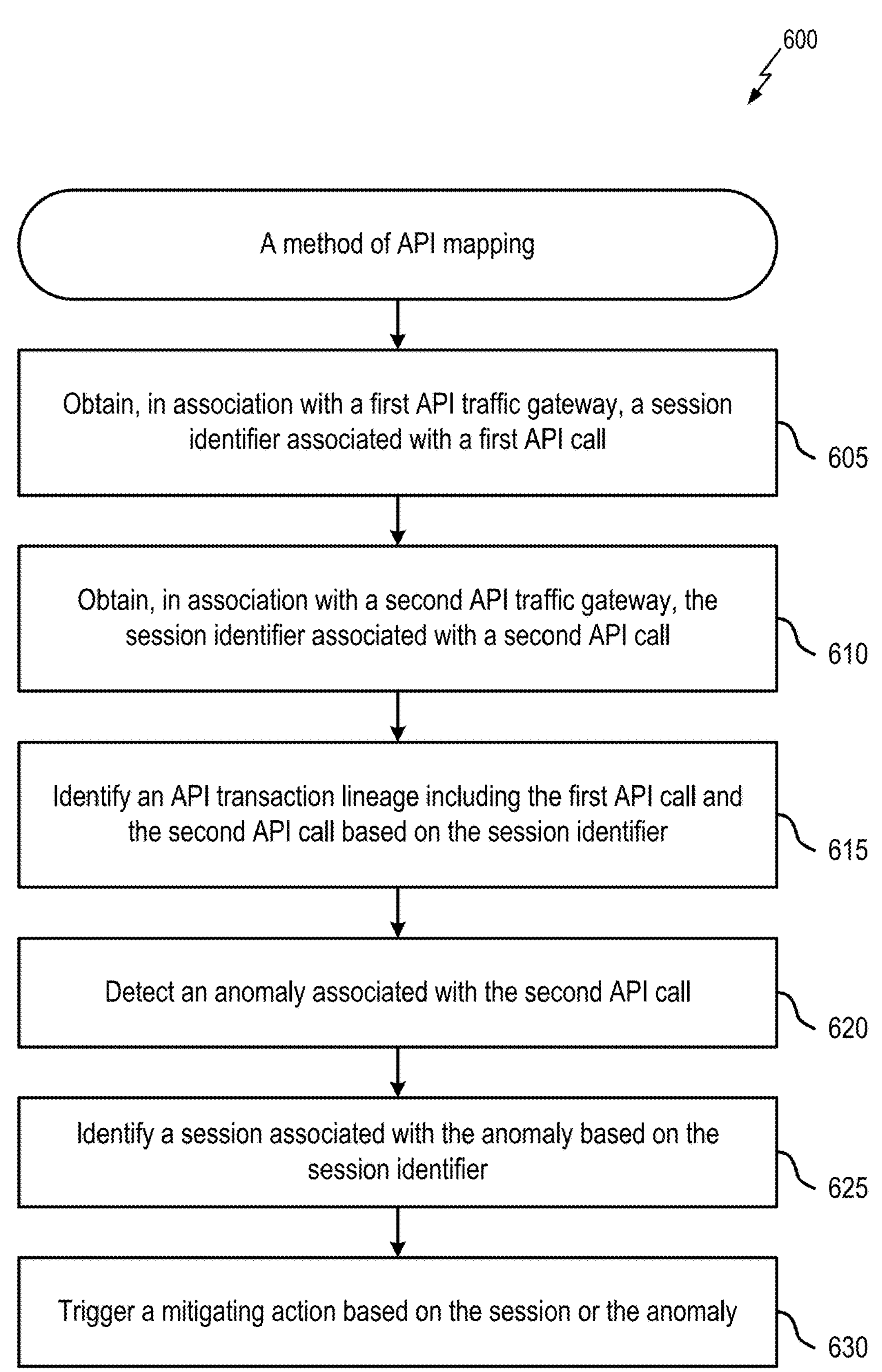
FIGS. 6-7 depict methods for API mapping.

FIG. 6 depicts an example method 600 for generating an API map. In one aspect, method 600 can be implemented by a microservice 104 and/or processing system 800 of FIG. 8.

Method 600 begins at block 605 with obtaining, in association with a first API entity, a session identifier associated with a first API call. The session identifier is embedded into the API call header by the first API entity, as described in FIG. 4, step 406, where the authentication API provides a session cookie that enables the derivation of the session identifier.

Method 600 then proceeds to block 610 with obtaining, in association with a second API entity, the session identifier associated with a second API call. This step builds on the propagation of session identifiers across interconnected services, as illustrated in FIG. 4, step 418, where the API gateway forwards an API call to an application API, embedding the session identifier into the API call.

Method 600 then proceeds to block 615 with identifying an API transaction lineage (as depicted in FIG. 3) including the first API call and the second API call based on the session identifier.

Method 600 then proceeds to block 620 with detecting an anomaly associated with the second API call. This step may utilize the anomaly detection system described in FIG. 5, reference number 522, which identifies irregularities in API interactions based on metadata and embeddings of transaction lineages, as discussed in FIG. 4, step 420, where API traffic is monitored for anomalies.

Method 600 then proceeds to block 625 with identifying a session associated with the anomaly based on the session identifier. For example, in FIG. 5, reference number 506, session information is linked to the API transaction lineage, providing contextual metadata such as user identity, device information, and geolocation.

Method 600 then proceeds to block 630 with triggering a mitigating action based on the session or the anomaly. For example, in FIG. 5, responsible parties 522 such as security investigators or automated systems are identified to perform mitigating actions, such as blocking malicious API calls or isolating compromised services, as described in FIG. 4, step 422, where session identifiers are provided to the API inventory for real-time response.

In some aspects, the session identifier is embedded in a hypertext transfer protocol header of the second API call by the second API entity.

In some aspects, the first API entity is an asynchronous entity.

In some aspects, the anomaly comprises a malicious attack.

In some aspects, method 600 further includes identifying identity information associated with the anomaly based on the session, wherein the mitigating action is based on the identity information.

In some aspects, the identity information comprises at least one of a device fingerprint, a network identifier, or geolocation information.

In some aspects, the API transaction lineage indicates the first API call, the second API call, and one or more services associated with the first API call or the second API call.

In some aspects, method 600 further includes identifying a business flow associated with the API transaction lineage based on at least one of the first API call or the second API call.

In some aspects, the business flow corresponds to a user action that triggered the first API call.

In some aspects, identifying the business flow further comprises identifying the business flow based on clustering a plurality of API transaction lineages including the API transaction lineage.

In some aspects, method 600 further includes obtaining the API transaction lineage from an API transaction lineage storage module based on detecting the anomaly.

In some aspects, method 600 further includes identifying a malicious attack based on the anomaly, the session identifier, and the API transaction lineage.

Note that FIG. 6 is just one example of a method, and other methods including fewer, additional, or alternative operations are possible consistent with this disclosure.

Figure 7:
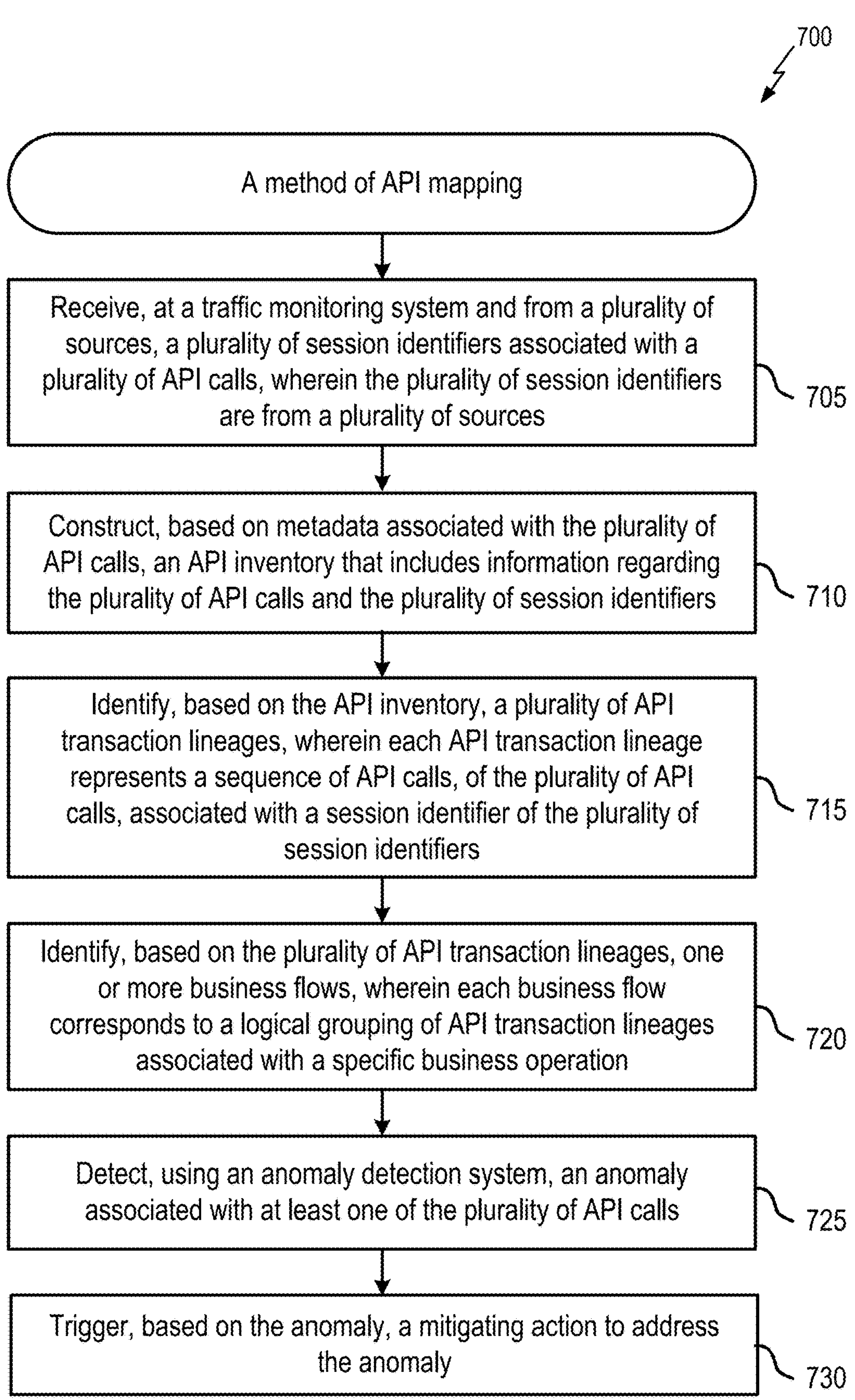

FIG. 7 depicts an example method 700 for API mapping. In one aspect, method 700 can be implemented by a microservice 104 and/or processing system 800 of FIG. 8.

Method 700 begins at block 705 with receiving, at a traffic monitoring system and from a plurality of sources, a plurality of session identifiers associated with a plurality of API calls, wherein the plurality of session identifiers are from a plurality of sources.

Method 700 then proceeds to block 710 with constructing, based on metadata associated with the plurality of API calls, an API inventory that includes information regarding the plurality of API calls and the plurality of session identifiers.

Method 700 then proceeds to block 715 with identifying, based on the API inventory, a plurality of API transaction lineages, wherein each API transaction lineage represents a sequence of API calls, of the plurality of API calls, associated with a session identifier of the plurality of session identifiers.

Method 700 then proceeds to block 720 with identifying, based on the plurality of API transaction lineages, one or more business flows, wherein each business flow corresponds to a logical grouping of API transaction lineages associated with a specific business operation.

Method 700 then proceeds to block 725 with detecting, using an anomaly detection system, an anomaly associated with at least one of the plurality of API calls.

Method 700 then proceeds to block 730 with triggering, based on the anomaly, a mitigating action to address the anomaly.

In some aspects, the plurality of sources include at least one of: an API entity, a service mesh, or an event bus.

In some aspects, the session identifier is based on a token associated with a session corresponding to the session identifier.

In some aspects, method 700 further includes adding, to an HTTP call associated with an API call, the session identifier based on the token.

In some aspects, the anomaly is associated with an API transaction lineage of the plurality of API transaction lineages and the session identifier, wherein the mitigating action is performable by an actor (e.g., responsible party), and wherein the actor is based on at least one of the session identifier, a service associated with the API transaction lineage, or one or more API entities.

In some aspects, method 700 further includes creating an embedding of the API transaction lineage.

In some aspects, method 700 further includes identifying the anomaly based on a similarity of the embedding and an embedding of another API transaction lineage or a business flow.

Note that FIG. 7 is just one example of a method, and other methods including fewer, additional, or alternative operations are possible consistent with this disclosure.

Example Processing System for API Mapping

Figure 8:
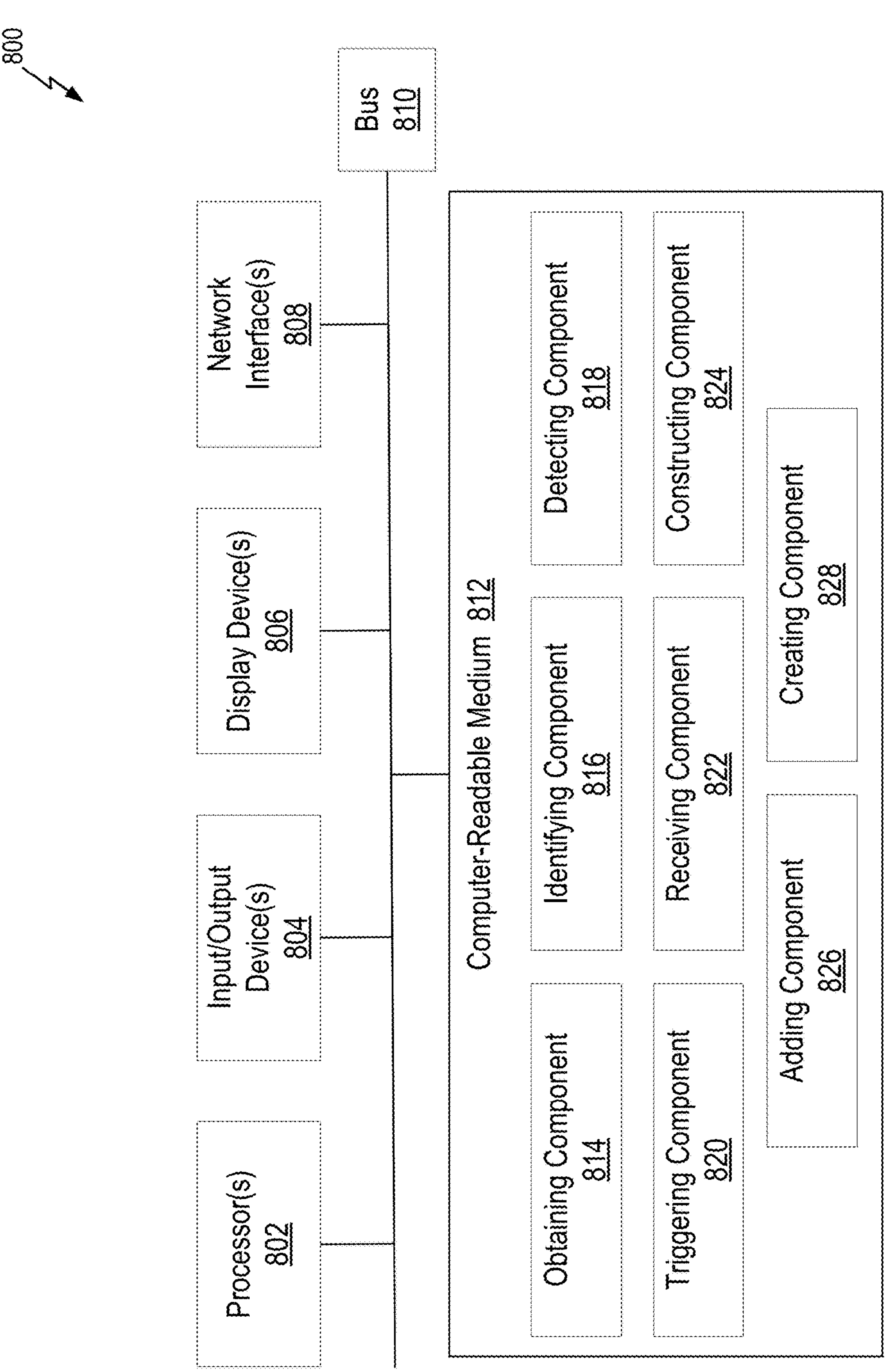
FIG. 8 depicts an example processing system with which aspects of the present disclosure can be performed.

FIG. 8 depicts an example processing system 800 configured to perform various aspects described herein, including, for example, method 600 as described above with respect to FIG. 6 and method 700 as described above with respect to FIG. 7.

Processing system 800 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes obtaining component 814, identifying component 816, detecting component 818, triggering component 820, receiving component 822, constructing component 824, adding component 826, and creating component 828. Processing of the components 814-828 may enable and cause the processing system 800 to perform the method 600 described with respect to FIG. 6, and to perform the method 700 described with respect to FIG. 7, or any aspect related to it.

In certain embodiments, obtaining component 814 is configured to obtain, in association with a first API entity, a session identifier associated with a first API call, as described in FIG. 6 with reference to block 605. In certain embodiments, obtaining component 814 is configured to obtain, in association with a second API entity, the session identifier associated with a second API call, as described in FIG. 6 with reference to block 610. In certain embodiments, identifying component 816 is configured to identify an API transaction lineage including the first API call and the second API call based on the session identifier, as described in FIG. 6 with reference to block 615. In certain embodiments, detecting component 818 is configured to detect an anomaly associated with the second API call, as described in FIG. 6 with reference to block 620. In certain embodiments, identifying component 816 is configured to identify a session associated with the anomaly based on the session identifier, as described in FIG. 6 with reference to block 625. In certain embodiments, triggering component 820 is configured to trigger a mitigating action based on the session or the anomaly, as described in FIG. 6 with reference to block 630.

In certain embodiments, receiving component 822 is configured to receive, at a traffic monitoring system and from a plurality of sources, a plurality of session identifiers associated with a plurality of API calls, wherein the plurality of session identifiers are from a plurality of sources, as described in FIG. 7 with reference to block 705. In certain embodiments, constructing component 824 is configured to construct, based on metadata associated with the plurality of API calls, an API inventory that includes information regarding the plurality of API calls and the plurality of session identifiers, as described in FIG. 7 with reference to block 710. In certain embodiments, identifying component 816 is configured to identify, based on the API inventory, a plurality of API transaction lineages, wherein each API transaction lineage represents a sequence of API calls, of the plurality of API calls, associated with a session identifier of the plurality of session identifiers, as described in FIG. 7 with reference to block 715. In certain embodiments, identifying component 816 is configured to identify, based on the plurality of API transaction lineages, one or more business flows, wherein each business flow corresponds to a logical grouping of API transaction lineages associated with a specific business operation, as described in FIG. 7 with reference to block 720. In certain embodiments, detecting component 818 is configured to detect, using an anomaly detection system, an anomaly associated with at least one of the plurality of API calls, as described in FIG. 7 with reference to block 725. In certain embodiments, triggering component 820 is configured to trigger, based on the anomaly, a mitigating action to address the anomaly, as described in FIG. 7 with reference to block 730.

Note that FIG. 8 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of API mapping comprising: obtaining, in association with a first API entity, a session identifier associated with a first API call; obtaining, in association with a second API entity, the session identifier associated with a second API call; identifying an API transaction lineage including the first API call and the second API call based on the session identifier; detecting an anomaly associated with the second API call; identifying a session associated with the anomaly based on the session identifier; and triggering a mitigating action based on the session or the anomaly.

Clause 2: The method of Clause 1, wherein the session identifier is embedded in a hypertext transfer protocol header of the second API call by the second API entity.

Clause 3: The method of any one of Clauses 1-2, wherein the first API entity is an asynchronous entity.

Clause 4: The method of any one of Clauses 1-3, wherein the anomaly comprises a malicious attack.

Clause 5: The method of any one of Clauses 1-4, further comprising identifying identity information associated with the anomaly based on the session, wherein the mitigating action is based on the identity information.

Clause 6: The method of Clause 5, wherein the identity information comprises at least one of a device fingerprint, a network identifier, or geolocation information.

Clause 7: The method of any one of Clauses 1-6, wherein the API transaction lineage indicates the first API call, the second API call, and one or more services associated with the first API call or the second API call.

Clause 8: The method of any one of Clauses 1-7, further comprising identifying a business flow associated with the API transaction lineage based on at least one of the first API call or the second API call.

Clause 9: The method of Clause 8, wherein the business flow corresponds to a user action that triggered the first API call.

Clause 10: The method of Clause 8, wherein identifying the business flow further comprises identifying the business flow based on clustering a plurality of API transaction lineages including the API transaction lineage.

Clause 11: The method of any one of Clauses 1-10, further comprising: obtaining the API transaction lineage from an API transaction lineage storage module based on detecting the anomaly; and identifying a malicious attack based on the anomaly, the session identifier, and the API transaction lineage.

Clause 12: A method of API mapping, comprising: receiving, at a traffic monitoring system and from a plurality of sources, a plurality of session identifiers associated with a plurality of API calls, wherein the plurality of session identifiers are from a plurality of sources; constructing, based on metadata associated with the plurality of API calls, an API inventory that includes information regarding the plurality of API calls and the plurality of session identifiers; identifying, based on the API inventory, a plurality of API transaction lineages, wherein each API transaction lineage represents a sequence of API calls, of the plurality of API calls, associated with a session identifier of the plurality of session identifiers; identifying, based on the plurality of API transaction lineages, one or more business flows, wherein each business flow corresponds to a logical grouping of API transaction lineages associated with a specific business operation; detecting, using an anomaly detection system, an anomaly associated with at least one of the plurality of API calls; and triggering, based on the anomaly, a mitigating action to address the anomaly.

Clause 13: The method of Clause 12, wherein the plurality of sources include at least one of: an API entity, a service mesh, or an event bus.

Clause 14: The method of any one of Clauses 12-13, wherein the session identifier is based on a token associated with a session corresponding to the session identifier.

Clause 15: The method of Clause 14, further comprising adding, to an HTTP call associated with an API call, the session identifier based on the token.

Clause 16: The method of any one of Clauses 12-15, wherein the anomaly is associated with an API transaction lineage of the plurality of API transaction lineages and the session identifier, wherein the mitigating action is performable by an actor (e.g., responsible party), and wherein the actor is based on at least one of the session identifier, a service associated with the API transaction lineage, or one or more API entities.

Clause 17: The method of Clause 16, further comprising: creating an embedding of the API transaction lineage; and identifying the anomaly based on a similarity of the embedding and an embedding of another API transaction lineage or a business flow.

Clause 18: A processing system, comprising: memory comprising computer-executable instructions; and one or more processors configured to execute the computer-executable instructions and cause the processing system to perform a method in accordance with any one of Clauses 1-17.

Clause 19: A processing system, comprising means for performing a method in accordance with any one of Clauses 1-17.

Clause 20: A non-transitory computer-readable medium storing program code for causing a processing system to perform the steps of any one of Clauses 1-17.

Clause 21: A computer program product embodied on a computer-readable storage medium comprising code for performing a method in accordance with any one of Clauses 1-17.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of application programming interface (API) mapping, comprising:

receiving, at a traffic monitoring system and from a plurality of API entities, a plurality of session identifiers associated with a plurality of API calls;

constructing, based on metadata associated with the plurality of API calls, an API inventory that includes information regarding the plurality of API calls and the plurality of session identifiers;

identifying, based on the API inventory, a plurality of API transaction lineages, wherein each API transaction lineage represents a sequence of API calls, of the plurality of API calls, associated with a session identifier of the plurality of session identifiers;

identifying, based on the plurality of API transaction lineages, one or more business flows, wherein each business flow corresponds to a logical grouping of API transaction lineages associated with a specific business operation;

detecting, using an anomaly detection system, an anomaly representing an API transaction lineage, of the plurality of API transaction lineages, deviating from the logical grouping of API transaction lineages associated with a particular business flow;

identifying a responsible party associated with the API transaction lineage of the plurality of API transaction lineages and the particular business flow; and triggering, based on the anomaly, a mitigating action for the responsible party to address the anomaly.

2. The method of claim 1, wherein the plurality of API entities include at least one of:

an API gateway, a service mesh, or an event bus.

3. The method of claim 1, wherein the session identifier is based on a token associated with a session corresponding to the session identifier.

4. The method of claim 3, further comprising adding, to a hypertext transfer protocol (HTTP) call associated with an API call, the session identifier based on the token.

5. The method of claim 1, wherein the anomaly is associated with the session identifier, wherein the mitigating action is performable by the responsible party, and wherein the responsible party is based on at least one of the session identifier, a service associated with the API transaction lineage, or one or more API entities.

6. The method of claim 5, further comprising:

creating an embedding of the API transaction lineage; and identifying the anomaly based on a similarity of the embedding and an embedding of another API transaction lineage or a business flow.

7. The method of claim 1, wherein an API entity of the plurality of API entities is an asynchronous entity.

8. The method of claim 1, wherein the anomaly comprises a malicious attack.

9. A method, comprising:

obtaining, in association with a first application programming interface (API) traffic gateway, a session identifier associated with a first API call;

obtaining, in association with a second API entity, the session identifier associated with a second API call;

identifying an API transaction lineage including the first API call and the second API call based on the session identifier;

identifying, based on clustering a plurality of API transaction lineages including the API transaction lineage, a business flow corresponding to a logical grouping of API transaction lineages associated with a specific business operation;

detecting an anomaly associated with the second API call and representing the API transaction lineage, of the plurality of API transaction lineages, deviating from the logical grouping of API transaction lineages corresponding to the business flow;

based on the session identifier:

identifying a session associated with the anomaly; and identifying a responsible party associated with the anomaly and the business flow; and triggering a mitigating action, performable by the responsible party, based on the session or the anomaly.

10. The method of claim 9, wherein the session identifier is embedded in a hypertext transfer protocol header of the second API call by the second API entity.

11. The method of claim 9, wherein the second API entity is an asynchronous entity.

12. The method of claim 9, further comprising identifying identity information associated with the anomaly based on the session, wherein the mitigating action is based on the identity information.

13. The method of claim 12, wherein the identity information comprises at least one of a device fingerprint, a network identifier, or geolocation information.

14. The method of claim 9, wherein the API transaction lineage indicates the first API call, the second API call, and one or more services associated with the first API call or the second API call.

15. The method of claim 9, further comprising identifying the business flow associated with the API transaction lineage based on at least one of the first API call or the second API call.

16. The method of claim 15, wherein the business flow corresponds to a user action that triggered the first API call.

17. The method of claim 9, further comprising:

obtaining the API transaction lineage from an API transaction lineage storage module based on detecting the anomaly; and identifying the anomaly as a malicious attack based on the session identifier and the API transaction lineage.

18. A processing system, comprising one or more memories and one or more processors coupled to the one or more memories, the one or more processors configured to cause the processing system to:

receive, at a traffic monitoring system and from a plurality of API entities, a plurality of session identifiers associated with a plurality of API calls;

construct, based on metadata associated with the plurality of API calls, an API inventory that includes information regarding the plurality of API calls and the plurality of session identifiers;

identify, based on the API inventory, a plurality of API transaction lineages, wherein each API transaction lineage represents a sequence of API calls, of the plurality of API calls, associated with a session identifier of the plurality of session identifiers;

identify, based on the plurality of API transaction lineages, one or more business flows, wherein each business flow corresponds to a logical grouping of API transaction lineages associated with a specific business operation;

detect, using an anomaly detection system, an anomaly representing an API transaction lineage, of the plurality of API transaction lineages, deviating from the logical grouping of API transaction lineages associated with a particular business flow;

identifying a responsible party associated with the API transaction lineage of the plurality of API transaction lineages and the particular business flow; and trigger, based on the anomaly, a mitigating action for the responsible party to address the anomaly.

19. The processing system of claim 18, wherein the one or more processors are configured to cause the processing system to identify identity information associated with the anomaly based on a session corresponding to the session identifier, wherein the mitigating action is based on the identity information.

20. The processing system of claim 19, wherein the metadata associated with the plurality of API calls comprises at least one of a transaction identifier, a timestamp, and identity information associated with the anomaly.

* * * * *